US010279903B2

(12) United States Patent
Bunting et al.

(10) Patent No.: US 10,279,903 B2
(45) Date of Patent: May 7, 2019

(54) IN-FLIGHT RECONFIGURABLE AIRCRAFT TAIL

(71) Applicant: Sikorsky Aircraft Corporation, Stratford, CT (US)

(72) Inventors: Colin Kemater Bunting, Guilford, CT (US); Michael Peter Strauss, New Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 662 days.

(21) Appl. No.: 14/717,778

(22) Filed: May 20, 2015

(65) Prior Publication Data

US 2017/0190412 A1    Jul. 6, 2017

Related U.S. Application Data

(60) Provisional application No. 62/000,826, filed on May 20, 2014.

(51) Int. Cl.
*B64C 29/02* (2006.01)
*B64D 45/04* (2006.01)
*B64C 1/30* (2006.01)
*B64C 25/52* (2006.01)

(52) U.S. Cl.
CPC .............. *B64C 29/02* (2013.01); *B64C 1/30* (2013.01); *B64C 25/52* (2013.01); *B64D 45/04* (2013.01)

(58) Field of Classification Search
CPC .... B64C 1/26; B64C 1/28; B64C 1/30; B64C 1/32; B64C 5/10; B64C 5/12; B64C 13/16; B64C 29/02; B64C 29/04; B64C 39/04; B64D 45/04; B64D 45/06; B64D 45/08

USPC ......................................................... 244/76 R
See application file for complete search history.

(56) References Cited

U.S. PATENT DOCUMENTS

| | | | | |
|---|---|---|---|---|
| 2,999,657 | A * | 9/1961 | Clark | B64C 5/12 244/91 |
| 3,966,142 | A | 6/1976 | Corbett et al. | |
| 4,085,911 | A * | 4/1978 | Nahodyl | B64C 1/30 244/12.4 |
| 5,395,073 | A * | 3/1995 | Rutan | B64C 3/385 244/38 |
| 5,758,844 | A | 6/1998 | Cummings | |
| 5,769,359 | A | 6/1998 | Rutan et al. | |
| 6,128,951 | A * | 10/2000 | Nance | G01M 1/125 701/124 |
| 6,224,012 | B1 * | 5/2001 | Wooley | B60F 5/02 244/121 |
| 6,845,939 | B1 * | 1/2005 | Baldwin | B64C 29/0033 244/137.1 |
| 7,118,066 | B2 * | 10/2006 | Allen | B64C 5/06 244/7 B |
| 8,500,067 | B2 | 8/2013 | Woodworth et al. | |
| 2006/0108479 | A1 * | 5/2006 | Rutan | B64C 3/50 244/159.1 |

(Continued)

*Primary Examiner* — Richard R. Green
*Assistant Examiner* — Brady W Frazier
(74) *Attorney, Agent, or Firm* — Cantor Colburn LLP

(57) ABSTRACT

A system and method for a reconfigurable aircraft having a fuselage with one or more propellers, at least one tail assembly, a processor, and a memory having instructions stored thereon that, when executed by the processor, cause the system to: determine a safety clearance for the at least one tail assembly; and selectively move the at least one tail assembly upon a determination that the safety clearance is achieved.

14 Claims, 3 Drawing Sheets

(56) References Cited

U.S. PATENT DOCUMENTS

| | | | | |
|---|---|---|---|---|
| 2011/0036939 A1* | 2/2011 | Easter | ............... | B60F 5/02 |
| | | | | 244/2 |
| 2011/0084170 A1* | 4/2011 | Parks | ............... | B64D 27/24 |
| | | | | 244/129.1 |
| 2013/0228646 A1* | 9/2013 | Stille | ............... | B64C 25/16 |
| | | | | 244/17.21 |

* cited by examiner

IN-FLIGHT RECONFIGURABLE AIRCRAFT TAIL

CROSS-REFERENCE TO RELATED APPLICATIONS

This application claims the benefit of U.S. provisional patent application Ser. No. 62/000,826, filed May 20, 2014, the entire contents of which are incorporated herein by reference.

FIELD OF THE INVENTION

The subject matter disclosed herein relates generally to the field of rotorcraft, and to a vertical take-off and landing aircraft with a reconfigurable tails or empennage that reduces its overall dimensions during flight.

DESCRIPTION OF RELATED ART

Typically, a vertical take-off and landing (VTOL) aircraft, e.g., a helicopter, tiltrotor, tiltwing, or a tail-sitter aircraft, can be airborne from a relatively confined space. Some tail-sitter aircraft can include a tail section (rear portion of the fuselage) to add flight stability during horizontal flight. However, this tail is not utilized while in the rotor-borne flight state. A tail-sitter aircraft has a fuselage that is vertically disposed during take-off and hover and must transition from a vertical flight state (i.e., rotor borne) to a horizontal flight-state (i.e., wing borne). However, in designing aircraft, such as a tail-sitter aircraft, occasional problems arise by using a tail for flight stability. For example, operational and practical dimensional constraints of the takeoff and landing environment limits where aircraft with a tail can be used. Such environments, such as an urban area or on a flight deck of a ship limit applicability of such aircraft due to the additional height requirements that a tail adds to the aircraft. This causes the resulting aircraft design to be less optimal because it must be able to take off and land in these confined environments. A VTOL aircraft that can operate in confined environments while having a tail for horizontal flight stability would be well received in the art.

BRIEF SUMMARY

According to an aspect of the invention, a method for controlling a reconfigurable aircraft includes receiving, with a processor, one or more signals indicative of position of the aircraft with the ground; determining, with the processor, information indicative of a safety clearance for at least one tail assembly; and selectively moving the at least one tail assembly upon a determination that the safety clearance is achieved.

In addition to one or more of the features described above, or as an alternative, further embodiments could include receiving sensor information indicative of weight of the vehicle on a plurality of landing gears.

In addition to one or more of the features described above, or as an alternative, further embodiments could include receiving sensor information for a strut and linkages coupled to the at least one tail assembly.

In addition to one or more of the features described above, or as an alternative, further embodiments could include providing the at least one tail assembly with a first portion that is coupled to a second portion.

In addition to one or more of the features described above, or as an alternative, further embodiments could include selectively moving the second portion from a retracted position to an extended position.

In addition to one or more of the features described above, or as an alternative, further embodiments could include attaching the second portion to the first portion in the extended position.

In addition to one or more of the features described above, or as an alternative, further embodiments could include retracting the second portion from the first portion to be substantially orthogonal with the first portion.

In addition to one or more of the features described above, or as an alternative, further embodiments could include coupling the at least one tail assemble to a wing portion of the aircraft.

According to another aspect of the invention, a system for a reconfigurable aircraft having a fuselage having one or more propellers; at least one tail assembly; a processor; and memory having instructions stored thereon that, when executed by the processor, cause the system to: determine a safety clearance for the at least one tail assembly; and selectively move the at least one tail assembly upon a determination that the safety clearance is achieved.

In addition to one or more of the features described above, or as an alternative, further embodiments could include at least one tail assembly with a first portion that is coupled to a second portion.

In addition to one or more of the features described above, or as an alternative, further embodiments could include a processor that is configured to selectively move the second portion from a retracted position to an extended position.

In addition to one or more of the features described above, or as an alternative, further embodiments could include a second portion that is attached to the first portion in the extended position.

In addition to one or more of the features described above, or as an alternative, further embodiments could include a second portion that is substantially orthogonal to the first portion in a retracted position.

In addition to one or more of the features described above, or as an alternative, further embodiments could include respective strut and linkages coupled to the at least one tail assembly.

In addition to one or more of the features described above, or as an alternative, further embodiments could include at least one tail assembly that is coupled to a wing portion of the aircraft.

Technical effects of a VTOL aircraft with reconfigurable tail assemblies includes operation in confined areas on land or on water, e.g., on a storage area of a flight deck of a ship or an urban landing zone. The VTOL aircraft of the present invention provides a reconfigurable tail assembly that can be selectively extended or retracted in flight and provides for a VTOL aircraft that can operate in confined areas of ships or urban environments.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1A:
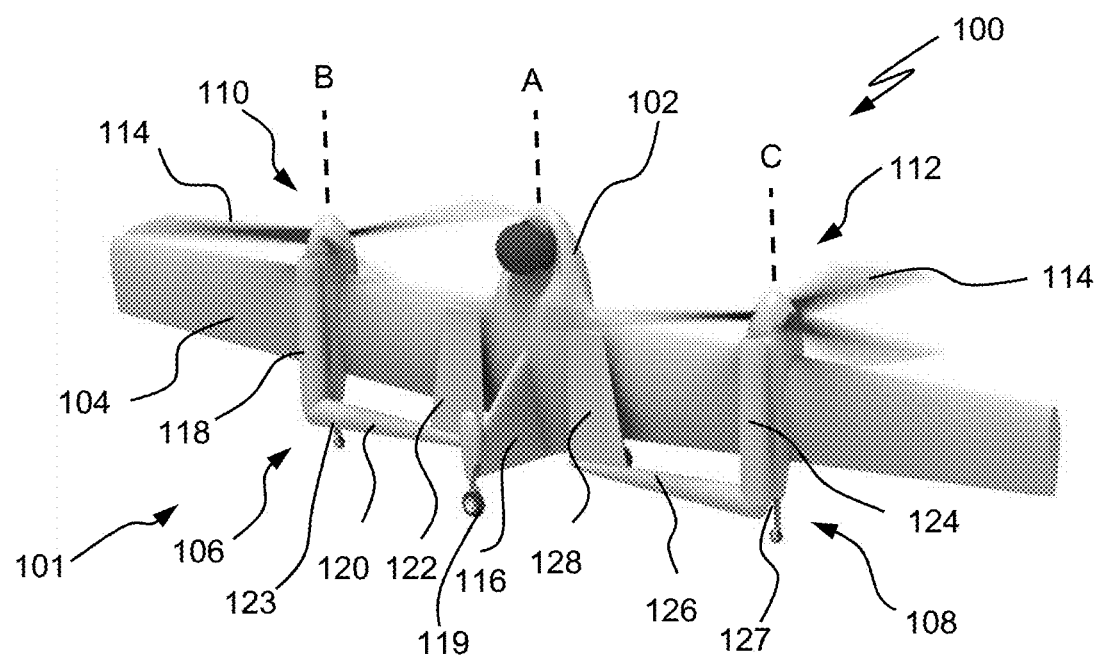
FIG. 1A is a perspective view of an exemplary aircraft with retracted tail assemblies during flight according to an embodiment of the invention.
Figure 1B:
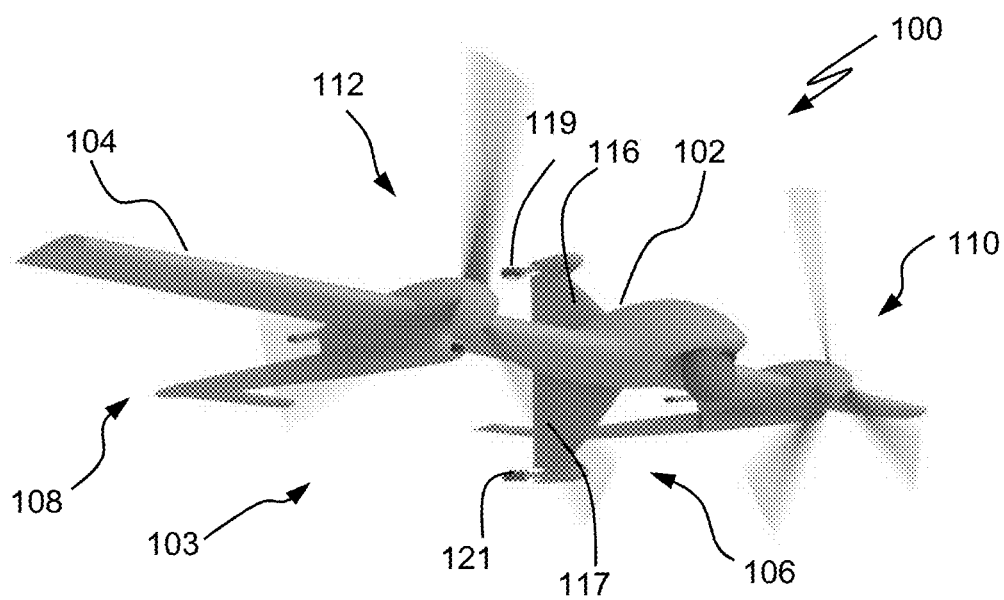
FIG. 1B is a perspective view of the aircraft of FIG. 1 but is shown during horizontal flight according to an embodiment of the invention.

Referring now to the drawings, FIGS. 1A and 1B illustrate a perspective of an exemplary VTOL vehicle in the form of a tail-sitter aircraft 100 for implementing a transition algorithm according to embodiments of the invention. As illustrated, tail-sitter aircraft 100 includes a fuselage 102, an elongated wing structure 104, and a plurality of tail assemblies 106 and 108. Although a particular configuration of a tail-sitter aircraft 100 is illustrated and described in the disclosed embodiments, it will be appreciated that other VTOL configurations of aircraft having a single or a plurality of stabilizing tails that can operate in confined areas on land or on water including fixed-wing aircraft, tiltrotor aircraft, rotary-wing aircraft, and tail-sitting VTOL aircraft including micro air- or organic air-vehicles may also benefit from embodiments disclosed.

As illustrated in FIG. 1A, an exemplary tail-sitter aircraft 100 is shown in hover during take-off and landing (i.e., rotor-borne flight state 101) whereby longitudinal axis A of fuselage 102 is oriented in a vertical direction with respect to the ground plane. Fuselage 102 is generally located in the middle of wing structure 104, which is generally orthogonal to longitudinal axis A of fuselage 102 and substantially parallel to the ground plane. Wing structure 104 is configured to provide lift when tail-sitter aircraft 100 is in horizontal flight state 103 (i.e., wing-borne flight) as shown in FIG. 1B. A plurality of propellers 110, 112 are mounted to wing structure 104 along respective axes B, C. Axes B, C are generally parallel to axis A. Propellers 110, 112 include substantially similar propeller blades 114 that provide thrust during hover and horizontal flight. Tail-sitter aircraft 100 includes a plurality of reconfigurable tail assemblies 106, 108 that can be selectively extended or retracted during flight.

FIG. 1A depicts tail-sitter aircraft 100 with retracted tail assemblies 106, 108 and FIG. 1B depicts tail-sitter aircraft 100 with extended tail-assemblies 106, 108 during a horizontal flight state 103 (i.e., wing-borne flight). In its extended state or orientation, tail assemblies 106, 108 are substantially aligned with respective longitudinal axes B and C. As shown in FIG. 1A, Tail assembly 106 includes a first portion 118, a hinged second portion 120, and a stabilizer fin 122 coupled to a distal end of second portion 120. An actuating device and linkages (not shown) are provided to enable the folding of second portion 120. Operation of the strut and linkages cause second portion 120 to pivot away from or towards first portion 118 at the hinge connecting the portions 118, 120. The actuating device and linkages functions to selectively retract and extend first portion 118 with respect second portion 120 during flight. The first portion 118 of tail assembly 106 also provides a landing gear 123 while tail-sitter aircraft 100 is on the ground. Additionally, landing wheels 119, 121 are coupled to respective vertical stabilizers 116, 117 to provide stability on the ground. Similarly, Tail assembly 108 includes a first portion 124, a hinged second portion 126, and a stabilizer fin 128 coupled to a distal end of second portion 126. An actuating device and linkages (not shown) are provided to enable the folding of second portion 126. Operation of the strut and linkages cause second portion 126 to pivot away from or towards first portion 124 at the hinge connecting the portions 124, 126. The actuating device and linkages function to selectively retract and extend first portion 124 with respect second portion 126 during flight. The first portion 124 of tail assembly 108 also provides a landing gear 127 while tail-sitter aircraft 100 is on the ground. Vertical stabilizers 116, 117 and stabilizer fins 122, 128 provide stability to tail-sitter aircraft 100 during horizontal flight.

Figure 2:
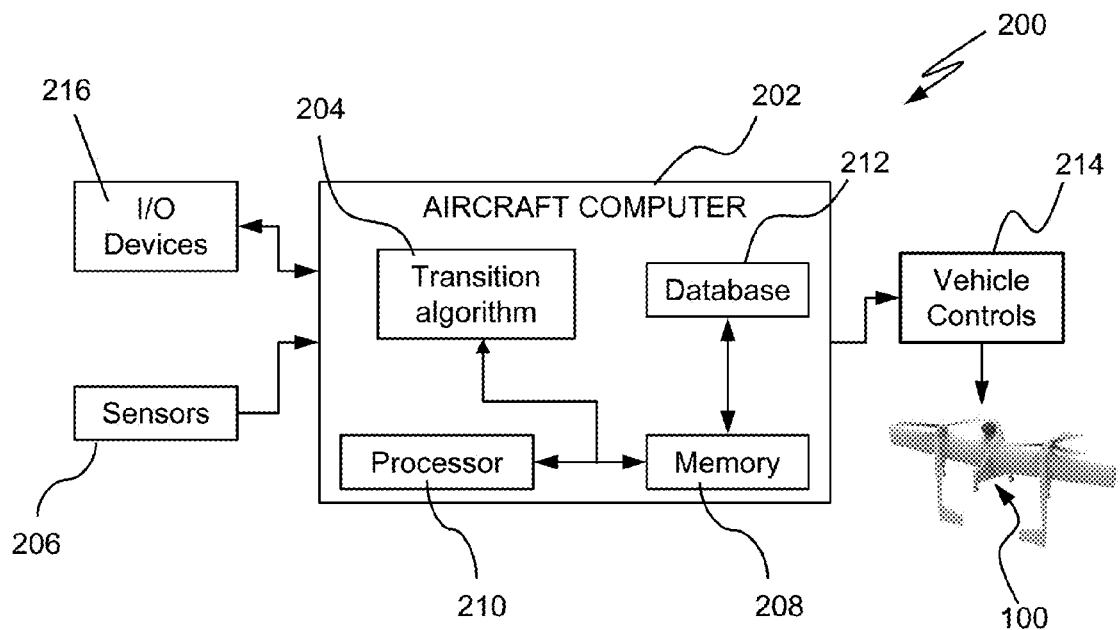
FIG. 2 is a schematic view of an exemplary computing system according to an embodiment of the invention.

FIG. 2 illustrates a schematic block diagram of a system 200 on board tail-sitter aircraft 100 according to an exemplary embodiment. As illustrated, the system 200 includes aircraft computer 202 that executes instructions for implementing a flight transition algorithm 204 for selectively retracting and extending tail assemblies 106, 108 (FIG. 1A-1B) during flight. Aircraft computer 202 may receive real-time information acquired from sensors 206, e.g., accelerometers, Light Detection And Ranging (LIDAR), weight-on-wheels, or an obstacle perception system that may be used to acquire data related to aircraft's 100 location to the ground in order to deploy or extend tail-assemblies 106, 108 (FIG. 1A-1B). Computer 202 includes a memory 208 that communicates with a processor 210. Memory 208 may store flight transition algorithm 204 as executable instructions that are executed by processor 210. The instructions may be stored or organized in any manner and at any level of abstraction, such as in connection with the execution of the flight transition algorithm 204. The processor 210 may be any type of processor (such as a central processing unit (CPU) or a graphics processing unit (GPU)), including a general purpose processor, a digital signal processor, a microcontroller, an application specific integrated circuit, a field programmable gate array, or the like. Also, in embodiments, memory 208 may include random access memory (RAM), read only memory (ROM), or other electronic, optical, magnetic, or any other computer readable medium onto which is stored the mixing algorithm described below.

The system 200 may include a database 212. The database 212 may be used to store information on which the tail-sitter aircraft 100 operates. The tail-sitter aircraft 100 may also operate on real time data acquired by sensors 206 or other terrain and obstacle perception sensors. Also, sensor data acquired by sensors 206 may be stored in database 212. The data stored in the database 212 may be based on one or more other algorithms or processes for implementing flight transition algorithm 204. For example, in some embodiments data stored in the database 212 may be a result of processor 210 having subjected data received from sensors 206 to one or more filtration processes. Database 212 may be used for any number of reasons. For example, database 212 may be used to temporarily or permanently store data, to provide a record or log of the data stored therein for subsequent examination or analysis, etc. In some embodiments, database 212 may store a relationship between data, such as one or more links between data or sets of data acquired on board tail-sitter aircraft 100.

System 100 may provide one or more controls, such as vehicle controls 214. Vehicle controls 214 may provide directives based on, e.g., flight configurations. Directives provided by vehicle controls 214 may include navigating tail-sitter aircraft 100 including extending or retracting tail assemblies 106, 108 (FIG. 1A-1B). The directives may be presented on one or more input/output (I/O) devices 216. I/O devices 216 may include a display device or screen, audio speakers, a graphical user interface (GUI), etc. In some embodiments, I/O devices 216 may be used to enter or adjust a linking between data or sets of data. It is to be appreciated that the system 200 is illustrative. In some embodiments, additional components or entities not shown in FIG. 2 may be included. In some embodiments, one or more of the components or entities may be optional. In some embodiments, the components or entities of system 200 may be arranged or configured differently from what is shown in FIG. 2. For example, in some embodiments I/O device(s) 216 may be commanded by vehicle controls 214, as opposed to being commanded by processor 214 as shown in FIG. 2.

Figure 3A:
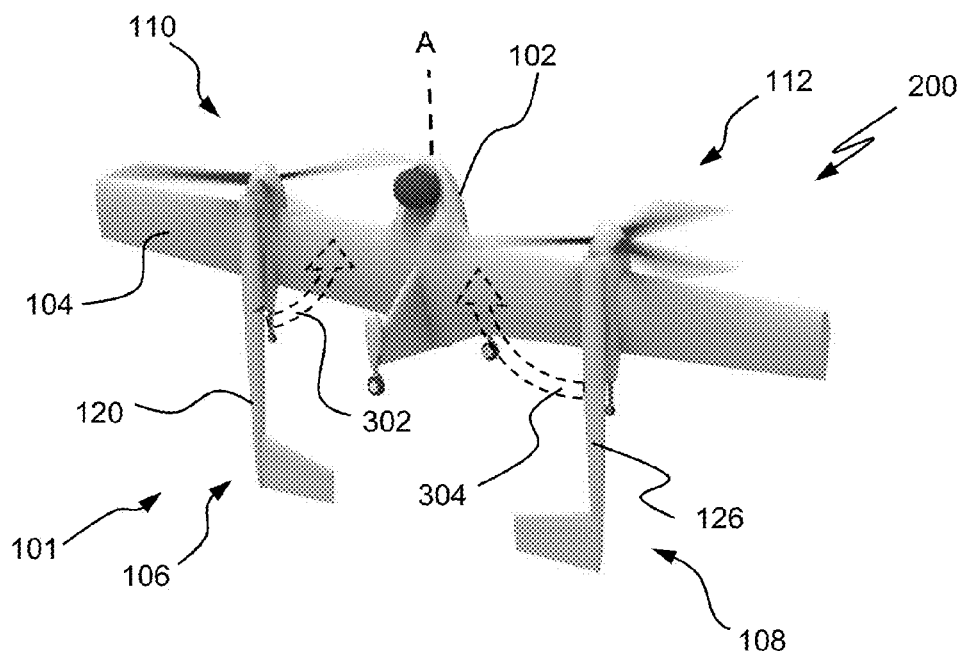
FIG. 3A is a perspective view an aircraft that is shown in transition to a rotor-borne state during landing according to an embodiment of the invention.
Figure 3B:
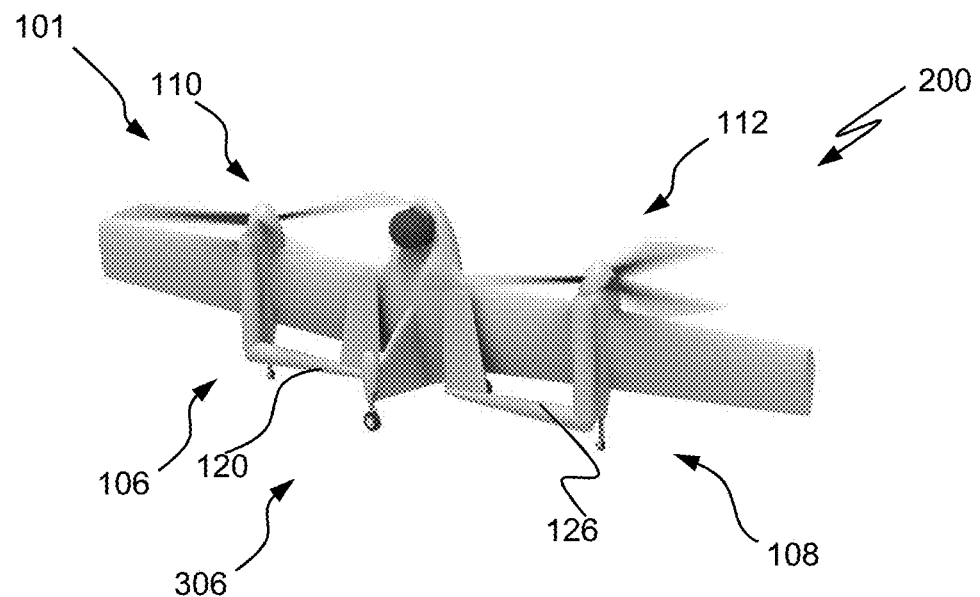
FIG. 3B is a perspective view an aircraft that is shown in transition to a rotor-borne state during landing according to an embodiment of the invention.

FIGS. 1B and 3A-3C illustrate views of configurations for tail-sitter aircraft 100 for transitioning from a horizontal flight state 103 to a rotor-borne flight state 101 for landing or take-off according to exemplary embodiments of the invention. In FIG. 1B, tail-sitter aircraft 100 is shown in a horizontal flight state 103 (i.e., wing-borne flight) whereby propellers 110, 112 provide thrust and lift while tail-assemblies 106, 108 provide stability. In the horizontal flight state 103, tail assemblies 106, 108 are fully extended and propellers 110, 112 are adjusted to provide propulsive thrust. In order to transition to a rotor-borne flight state 101 (FIG. 3A) such as, for example, during landing, propellers 110,112 and wing structure 104 are adjusted to pitch up and/or yaw and cause tail-sitter aircraft 100 to be generally vertically oriented. In this state, fuselage 102 is oriented along longitudinal axis A which is substantially orthogonal to the ground plane. Tail-sitter aircraft 100 continues transitioning and maintains a safety clearance between tail assemblies 106, 108 and a ground or other surface or obstacle. During this transition, portions 120, 126 of respective tail assemblies 106, 108 are rotated inwards in direction of arrows 302, 304 towards longitudinal axis A. FIG. 3B is shown with fully retracted tail assemblies 106, 108.

Figure 3C:
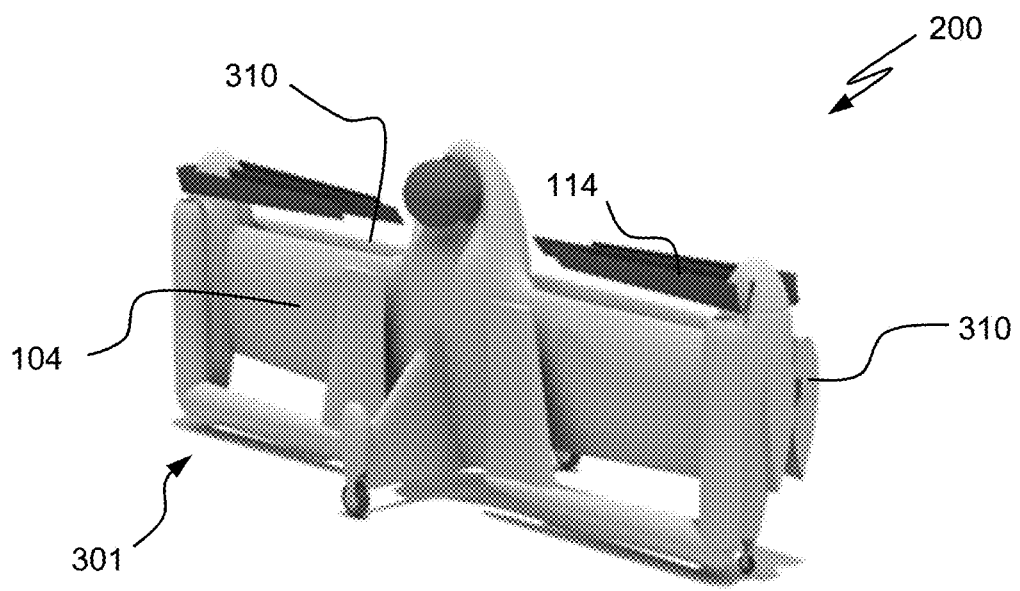
FIG. 3C is a perspective view an aircraft that is shown in a stored configuration according to an embodiment of the invention.

In FIG. 3B, once tail-sitter aircraft 100 has completed its transition whereby—tail-assemblies 106, 108 are fully retracted, tail-sitter aircraft 100 may descend vertically downwards for landing until it transitions to a ground configuration 306. In embodiments, as shown in FIG. 3C, tail-sitter aircraft 100 can be stored by transition from ground configuration 306 to a stored configuration 301 and may include selectively foldable wing portions 310 of wing structure 104 and propeller blades 114 that are selectively foldable which further reduce the profile of tail-sitter aircraft 100 for during storage. In order to transition from a take-off configuration 306 to a rotor-borne flight state 101 (FIG. 1A), the above process depicted in FIGS. 1A and 3A-3C is reversed. For example, wing portions 310 can be selectively extended to a ground configuration 306 (FIG. 3B). In this configuration, propellers 110, 112 are operated so as to provide lift. During launch, propellers 110, 112 function as rotors to provide lift to tail-sitter aircraft 100. Once a predetermined height, e.g., a safety clearance for portions 120, 126 and a stall speed or above is achieved, tail-sitter aircraft 100 can selectively extend portions 120, 126 to transition to a rotor-borne flight state 101 (FIG. 3A). In this state, tail-sitter aircraft is in an intermediate flight state. As tail-sitter aircraft 100 continues transitioning, the angle of attack of wing structure 104, and throttle of propellers 106, 108 may be adjusted to cause the fuselage 102 to pitch down and yaw. As the tail-sitter aircraft 100 continues to pitch and roll, it completes the transition to a horizontal flight state 103 (FIG. 1B) whereby the fuselage 102 is substantially horizontal and propellers 106, 108 provide thrust to propel tail-sitter aircraft 10

Benefits of the exemplary tail-sitter aircraft 100 include operation in confined areas on land or on water such as, a storage area of a flight deck of a ship where such operation would not be feasible without the embodiments disclosed herein. Prior art tail-sitter aircraft have foldable fuselages which add complexity to extend and retract such aircraft while not substantially providing reduced profile for operation in these confined areas. The tail-sitter aircraft 100 of the present invention provides a selectively extendable tail assembly that provides stability during flight as well as a landing gear during landing for a tail-sitter aircraft to operate in confined areas of ships or urban environments.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for a reconfigurable aircraft, comprising:
   a fuselage having one or more propellers;
   a first tail assembly comprising a first portion that is coupled to a second portion;
   a second tail assembly comprising a third portion that is coupled to a fourth portion;
   a processor; and
   a memory having instructions stored thereon that, when executed by the processor, cause the system to:
   determine a safety clearance for the first tail assembly and the second tail assembly;
   selectively move the first tail assembly upon a determination that the safety clearance is achieved by selectively moving the second portion between a retracted position relative to the first portion and an extended position relative to the first portion; and
   selectively move the second tail assembly upon a determination that the safety clearance is achieved by selectively moving the fourth portion between a retracted position relative to the third portion and an extended position relative to the third portion,
   wherein the second portion rotates towards the fourth portion and the fourth portion rotates towards the second portion when selectively moving the second portion and the fourth portion from the extended position to the retracted position.

2. The system of claim 1, wherein the second portion is attached to the first portion in the extended position.

3. The system of claim 1 wherein the second portion is substantially orthogonal to the first portion in a retracted position.

4. The system of claim 1, further comprising respective strut and linkages coupled to at least one of the first tail assembly and the second tail assembly.

5. The system of claim 1, wherein at least one of the first tail assembly and the second tail assembly is coupled to a wing portion of the aircraft.

6. A method for controlling a reconfigurable aircraft, comprising:
receiving, with a processor, one or more signals indicative of position of the aircraft with the ground;
determining, with the processor, information indicative of a safety clearance for a first tail assembly comprising a first portion that is coupled to a second portion and a second tail assembly comprising a third portion that is coupled to a fourth portion;
selectively moving the first tail assembly upon a determination that the safety clearance is achieved by selectively moving the second portion between a retracted position relative to the first portion and an extended position relative to the first portion; and
selectively moving the second tail assembly upon a determination that the safety clearance is achieved by selectively moving the fourth portion between a retracted position relative to the third portion and an extended position relative to the third portion,
wherein the second portion rotates towards the fourth portion and the fourth portion rotates towards the second portion when selectively moving the second portion and the fourth portion from the extended position to the retracted position.

7. The method of claim 6, further comprising receiving sensor information indicative of weight of the aircraft on a plurality of landing gears.

8. The method of claim 7, further comprising receiving sensor information for a strut and linkages coupled to at least one of the first tail assembly and the second tail assembly.

9. The method of claim 6, further comprising attaching the second portion to the first portion in the extended position.

10. The method of claim 6, further comprising retracting the second portion from the first portion to be substantially orthogonal with the first portion.

11. The method of claim 6, further comprising coupling at least one of the first tail assembly and the second tail assembly to a wing portion of the aircraft.

12. The system of claim 1, wherein the first portion comprises a landing gear, and wherein the third portion comprises a landing gear.

13. The system of claim 1, wherein the second portion comprises a first stabilizer fin coupled to a distal end of the second portion, and wherein the fourth portion comprises a second stabilizer fin coupled to a distal end of the fourth portion.

14. The system of claim 1, wherein the second portion rotates away from the fourth portion and away from the fuselage and the fourth portion rotates away from the second portion and the fuselage when selectively moving the second portion and the fourth portion from the retracted position to the extended position.

* * * * *